T. K. ANDERSON.
Vapor Stove.
No. 6,107.
Patented Feb. 13, 1849.
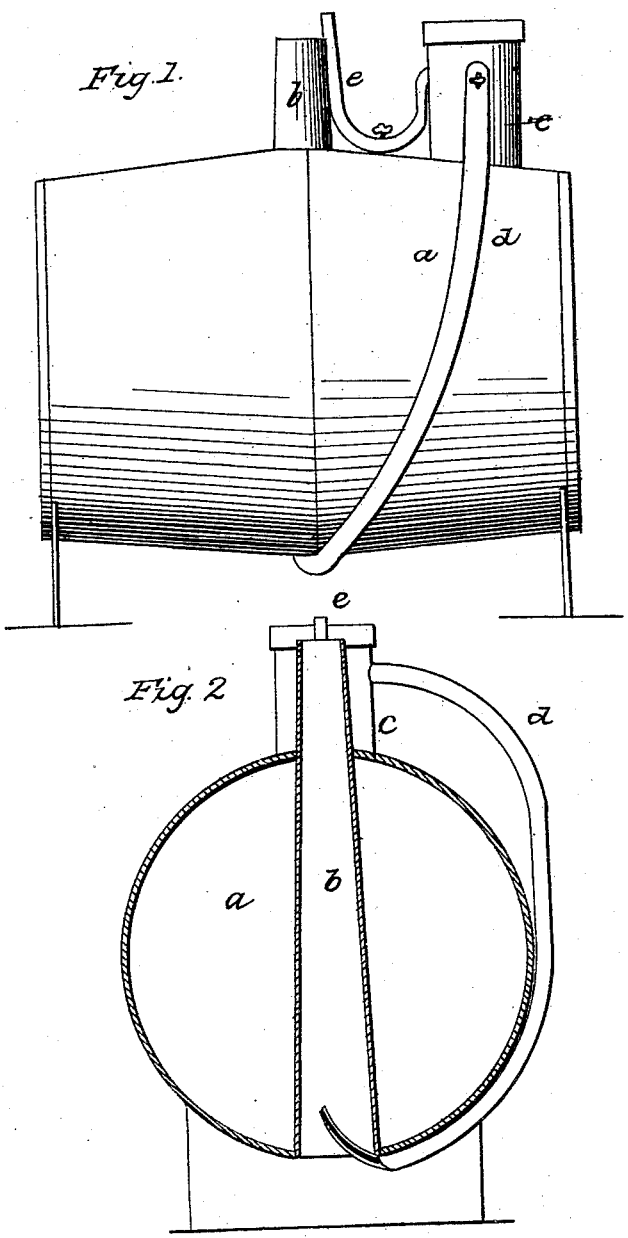

UNITED STATES PATENT OFFICE.

THOMAS K. ANDERSON, OF PAINTED POST, NEW YORK.

APPARATUS FOR HEATING BY VAPOR OF ALCOHOL.

Specification of Letters Patent No. 6,107, dated February 13, 1849.

*To all whom it may concern:*

Be it known that I, THOMAS K. ANDERSON, of Painted Post, in the county of Steuben and State of New York, have invented a certain new and useful Apparatus for the Economical Use of Fuel, and that the following is a full, clear, and exact description of the principle or character which distinguishes it from all other things before known and of the usual manner of making, modifying, and using the same, reference being had to the accompanying drawing, which forms a part of this description, in which—

Figure 1, is a side elevation. Fig. 2, is a cross section.

The same letters refer to like parts in all the figures.

The nature of my improvements consist in the arrangement and construction of an apparatus that will by its own heat generate the substance for combustion sufficient to become a self feeder, and with the parts arranged in a manner that fits it for heating rooms, generating steam, and other similar and useful purposes.

The construction is substantially as follows, although I do not confine myself to this form, which is necessarily adapted or changed for each particular purpose to which it is applied. Through a reservoir (*a*) which is made to contain the material to be burned, a tube (*b*) is passed, either vertically, horizontally, or at any required inclination; on the top of said reservoir (*a*) there is placed a gas chamber (*c*) from which one or more pipes (*d*) issue and descend down to the bottom of the tube (*b*) into which it turns, having its orifice turned so as to cause the current of gas issuing therefrom to impinge against the sides of the tube (*b*) as clearly shown in the section Fig. 2; this direction of the gas against the side of the tube is absolutely essential, without which the apparatus would not work, and it forms an important feature of my improvement; for should the orifice of the pipe (*d*) be so turned as to direct the current of gas therefrom directly up the tube in a line with its axis, it would be immediately blown out, in consequence of the draft through the tube; the pipes are all governed by stop cocks, which regulate the supply of gas. In addition to those gas-feeding pipes (*d*) already mentioned, I affix to the same chamber (*c*) other small pipes (*e*) for affording an additional supply of combustible matter to the current of ignited gas issuing from the tube, it being so arranged as to effect that purpose, and thus materially increase the heat at that point, by which I obtain a powerful heater at a small cost of fuel, by saving all the heat, and directing it upon the point to be acted on.

The material to be used in combustion may be alcohol, any of the volatile or fixed oils, or any kind of grease, the proper modification of parts being made to adapt the apparatus to either one of these ingredients.

I am aware that alcohol lamps have been made to generate the gas by which they were supplied in several ways, but in those applications they were unsuited to heating purposes, for if sufficient gas was generated to supply a stream sufficiently powerful for heating purposes to any practical extent, the blaze would be instantly blown away and put out, if the burner was placed low enough to heat the reservoir, and when heating has been attempted an auxiliary lamp or heater has been used.

Having thus fully described my apparatus for the economical use of fuel for heating purposes what I claim therein as new and for which I desire Letters Patent is—

1. The combination of a reservoir for holding the material to be burned, having a tube running through it in any convenient direction with one or more small pipes or burners leading from the top thereof and introduced in an angular direction near the bottom as set forth so as to cause the blaze therefrom to impinge on the side of the tube the heat of the blaze causing a sufficient and constant supply of vapor to the burners without the aid of an auxiliary heater and all the surplus heat being directed through the tube to the top thereof for heating purposes.

2. I also claim in combination with said burner or burners one or more jets leading into the current issuing through the tube for incerasing the heat as herein specified.

THOMAS K. ANDERSON.

Witnesses:
SAML. ERWIN,
J. J. GREENOUGH.